United States Patent Office 3,326,975
Patented June 20, 1967

3,326,975
AMIDE OR IMINE HYDROCARBON FUEL STABILIZERS
Gerald R. Lappin, Kingsport, Tenn., assignor to Eastman Kodak Company, Rochester, N.Y., a corporation of New Jersey
No Drawing. Filed Feb. 11, 1963, Ser. No. 257,741
1 Claim. (Cl. 260—561)

This invention relates to new compositions of matter useful as additives for petroleum oil fractions and especially adapted as thermal stabilizers for jet fuels and other liquid hydrocarbon fuels that are subject to degradation at elevated temperature. More particularly the invention relates to amide and imine products obtained by reacting aliphatic primary amines with certain aldehydes and anhydrides at elevated temperature and to compositions comprising such amide products in admixture with petroleum oil fractions.

In Thompson and Ownby patent application Ser. No. 65,954, filed Oct. 31, 1960, now abandoned, and Thompson and Lappin patent application Ser. No. 77,843, filed Dec. 23, 1960, now U.S. Patent 3,173,770 there is disclosed the reaction of ethylenedinitrilotetraacetic acid, otherwise known as EDTA, with $C_4$–$C_{24}$ primary aliphatic amines under conditions adapted to yield imide and amide reaction products useful as heat stabilizers in hydrocarbon oils, jet fuels and the like fuel compositions. Although such stabilizers have proved highly successful, difficulty has sometimes been experienced in removing unreacted amine from the crude inhibitor product, especially due to low solubility in acids, making ordinary acid extraction procedures impractical. Also known ion-exchange resin column procedures have not proved entirely satisfactory in removing unreacted amine. Therefore it should be apparent that development of a process useful for removing unreacted amine remaining after reacting EDTA with a long-chain amine to produce stabilizers such as those of the Thompson and Ownby patent application and Thompson and the Lappin patent application represents a highly desirable result.

Accordingly one object of the present invention is to provide a method for removing unreacted or excess amine present in an EDTA-amine reaction product. Another object is to provide an amide or imine product of enhanced effectiveness as a thermal stabilizer for hydrocarbon fuels. Still another object is to provide a heat-stabilized fuel composition. Other objects will be apparent hereinafter.

In its broader aspects my invention involves reacting a $C_4$–$C_{24}$ primary aliphatic amine with an aromatic aldehyde or an acid anhydride to give a novel amide or imine which is highly effective as a thermal stabilizer for hydrocarbon fuels. Quite unexpectedly this reaction product is even more effective as a thermal stabilizer for hydrocarbon fuels than an EDTA-amine reaction product. The preferred amine to be reacted with the anhydride or aldehyde is a long branched-chain alkyl amine containing 4–24, preferably 8–18 carbon atoms. Preferred anhydrides include acetic anhydride, propionic anhydride, butyric anhydride or a dibasic acid anhydride such as succinic anhydride. Acetic anhydride is preferred since any excess anhydride in the case of acetic anhydride, as well as the by-product acid, is readily removed by extraction with water. Preferred aldehydes include benzaldehyde and salicylaldehyde. The reaction between the long-chain amine, when the amine is excess amine in an EDTA-amine reaction, and the anhydride or acetaldehyde substantially eliminates the presence of any undesirable salt-type products.

The process of the present invention may be illustrated by the following two equations, wherein R represents a methyl, ethyl or propyl group, R' represents a branched alkyl group containing 4–24 carbon atoms and X represents an hydroxy, halogen, or lower alkyl ($C_1$ to $C_8$, preferably $C_1$ to $C_4$) group or hydrogen.

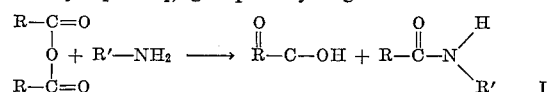

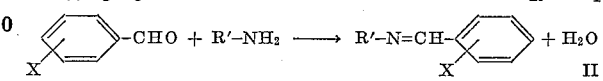

The process of this invention is carried out by adding the anhydride or aldehyde in a substantially equimolar amount to the amine and heating for about 30 minutes to 4 hours at a temperature of 100° to 225° C. preferably 150° to 190° C. The resulting mixture is then cooled and washed to remove any unreacted anhydride, aldehyde or other unreacted material. When other than acetic anhydride is used, a dilute aqueous alkali wash is preferred. The aldehyde or anhydride is preferably added to the amine in small aliquots or increments until the reaction subsides. The end of the reaction is indicated in the case of the addition of aldehyde when no further evolution of water occurs. If a lower boiling solvent such as benzene is used to azeotrope the water, the reaction temperature may be lowered to 100 to 150° C.

The amount of aldehyde or anhydride added will depend upon the amount of amine used, that is, the excess of amine present in the reaction mixture in the case of a preliminary reaction between EDTA and the amine, the usual amounts being 0.25 to 1.5 molar proportions, 0.30 to 0.70 molar proportions being preferred in the case of aldehyde and in the case of anhydride 0.3 to 1.5 molar proportions being the usual amounts, preferably 0.5 to 1.0.

The amine-aldehyde or anhydride reaction products of our invention as above indicated are particularly useful as thermal stabilizers in petroleum oil fractions such as unstable jet fuels. The concentration stabilizer in the petroleum oil will depend upon the composition of the particular oil and on the degree of thermal stability desired. Ordinarily, concentrations of about 1 to 100 lb./1,000 bbl. of oil (about 0.00038 to 0.038 weight percent) will suffice, although for some applications larger or smaller amounts can be used, e.g., 0.0001 to 0.05 weight percent. My stabilizers can be used alone or with other additives such as dyes, dispersants, metal deactivators, antioxidants, anticorrosion agents, and antiknock agents. They can be added to fuels in the pure form or as concentrates in solvents such as alcohols, Stoddard solvent, kerosene, etc. The concentrates also contain other additives such as those mentioned.

Amines suitable for reaction according to my invention are primary aliphatic amines having from 4 to 24 carbon atoms per molecule. An especially preferred amine is the product of Rohm and Haas Company known as Primene 81–R. This is a mixture of branched chain, primary, alkyl amines in which the amine group is attached to a tertiary carbon atom and which have 12 to 15 carbon atoms per molecule and an average molecular weight of about 200. When this type of amine is employed, products of the invention according to the structural Formulae I or II above are formed in which R' is a branched-chain alkyl group of 12 to 15 carbon atoms.

Another commercial mixture of amines suitable for making my products is the product of Rohm and Haas Company known as Primene JM–T. This is essentially a mixture of branched chain, primary alkyl amines of structure similar to the amines of Primene 81–R, but containing 18 to 24 carbon atoms per molecule. Typical examples of other suitable amines are 2-ethylhexylamine, octylamine and dodecylamine.

In the products of the invention made from amines of the types described above, R' is an aliphatic hydrocarbon group of 4 to 24 carbon atoms. Other amines can also be used which form products of the invention in which R' is an aliphatic group of 4 to 24 carbon atoms but not necessarily an aliphatic hydrocarbon group. Thus a suitable class of amine includes the Duomeen products of Armour and Company. One of such products, known as Duomeen 12, is a propylenediamine derivative having the structure, $H_2N-CH_2-CH_2-CH_2-NH-C_{12}H_{25}$. This type of amine fits the definition of primary amines used for making the products of the invention, the primary amino group being the reactive group of the molecule. In products of the invention of the Formulae I or II prepared from this type of amine the substituent R' has the structure, $-(CH_2)_n-NH-R''$, wherein $n$ is 2 or 3 and R'' is an aliphatic hydrocarbon group of 8 to 18 carbon atoms.

Of the selected reaction conditions used in forming the preliminary EDTA-amine reaction products prior to reacting the unreacted or excess amine with an aldehyde or anhydride reaction temperature is particularly important. The temperature must be above about 200° C. and preferably is in the range of about 200 to 220° C.

Reaction time when the amine is thus preliminarily reacted with EDTA is also important and must be sufficient to yield the desired imide or amide preliminary reaction products. When the reaction temperature is in the range of 200 to 220° C. this reaction time must be at least about 3 hours, the preferred reaction time being at least about 6 hours, e.g. 6 to 8 hours. It should be understood that not all combinations of reaction temperature and reaction time within the disclosed ranges both for the preliminary EDTA-amine reaction and for the amine-aldehyde or anhydride reaction of this invention will produce the same results and that to form products with the shorter reaction times indicated generally the higher temperatures should be used.

A better understanding of our invention will be had by reference to the following examples, which are intended to be illustrative only.

*Example I*

A mixture of 300 g. (1.5 moles) of Primene 81-R, 146 g. (0.5 mole) of EDTA and 450 g. of kerosene was stirred and heated under reflux. The water formed was caught in a Dean-Stark tube. The initial pot temperature was 190° C., the final temperature was 210° C. After 220 minutes, 27 ml. (1.5 moles) of water had been collected. Heating and stirring were continued and to the reaction product was added salicylaldehyde as follows:

25 g. first portion, then, after ten minutes a second portion of 5 g., then after another ten minutes a third portion of 3 g., then after ten minutes a fourth portion of 2 g. No further water was evolved after the addition of the last portion. The total amount of salicylaldehyde used was 35 g. (0.29 mole). A substantially pure amine-aldehyde reaction product was thus obtained and collected.

*Example II*

The initial reaction between 1.5 moles Primene 81-R and 0.5 mole of EDTA in 450 g. of kerosene was carried out as described in Example I. Benzaldehyde was then used in place of salicylaldehyde in the final step of the reaction. A total of 34 g. (0.32 mole) of benzaldehyde was required when added as in Example I.

*Example III*

A mixture of 146 g. (0.5 mole) of EDTA, 400 g. (2.0 mole) of Primene 81-R and 550 g. of kerosene was heated as in Example I until 36 ml. (2.0 moles) of water had been collected. The time required was about 3.5 hours. Salicylaldehyde was then added as follows while continuing heating at 200° C.:

25 g. first portion, after twenty minutes a second portion of 5 g., after ten minutes more a third portion of 1 g. No further water was evolved. The total amount of salicylaldehyde was 31 g. (0.25 mole).

*Example IV*

A mixture of 300 g. (1.5 moles) of Primene 81-R, 146 g. (0.5 mole) of EDTA and 450 g. of kerosene was heated at 190–210° C. in a flask equipped for the azeotropic removal of water. After 3.5 hours, 27 ml. (1.5 moles) of water had been collected. The temperature was then lowered to 160° C. and 51 g. (0.5 mole) of acetic anhydride was added. Heating was continued for 1 hour at 160–180° C. The reaction mixture was then cooled to about 50° C. and washed with two 250-ml. portions of warm water to obtain and isolate a substantially pure amine-anhydride reaction product.

*Example V*

The preparation was carried out as in Example IV except that 79 g. (0.5 mole) of isobutyric anhydride was used in place of the acetic anhydride and the final washing was carried out with two 250-ml. portions of 10 percent aqueous sodium hydroxide.

*Example VI*

The preparation was carried out as in Example V except that 45 g. (0.45 mole) of succinic anhydride was used in place of the isobutyric anhydride.

*Example VII*

A mixture of 400 g. (2.0 moles) of Primene 81-R, 146 g. (0.5 mole) of EDTA and 550 g. of kerosene was heated as in Example IV until 36 ml. (2.0 moles) of water had been collected. The mixture was then treated with 51 g. (0.5 mole) of acetic anhydride and washed as described in Example IV.

I have tested the ability of the products of the above examples to improve the thermal stability of jet fuels in the CFR fuel coker test. A discussion of the test was given by Crampton et al. in a paper entitled "Thermal Stability—A New Frontier for Jet Fuel" at the SAE Summer Meeting in 1955. Instructions for operating the CFR Fuel Coker are contained in Manual No. 3 of Coordinating Research Council, Inc.

The test involves pumping the jet fuel at 150 p.s.i. and a flow rate of 4–6 pounds/hour through a preheater assembly and then through a furnace assembly which contains a 20 micron sintered stainless-steel filter. The fuel is heated to 300–400° F. in the preheater and to 400–500° F. in the furnace. Fuel degradation products appear as deposits on the preheater. They are also trapped on the furnace filter where they cause a pressure drop on a mercury manometer connected across the filter. Usually the test is run until a pressure drop of 25 in. Hg is indicated on the manometer, or for 300 minutes, whichever occurs first. Fuel stability is expressed in "goodness" units, which are a measure of time required for the pressure drop to reach 25 in. Hg, or of the actual pressure drop, if less than 25 in. Hg, at 300 minutes. The ratings range from 0 for immediate clogging to 900 for no manometer pressure drop at 300 minutes. After the test the preheater is dismantled and the inner aluminum tube around which the fuel flows is inspected for deposits. These are rated as to extent and color. The preheater tube deposit is indicated in terms of percent light brown stain.

The CFR fuel coker test has been applied to five different jet fuel compositions containing my thermal stability additives. The fuels were liquid hydrocarbon fractions of the JP-4, JP-5 and JP-6 grades. The characteristics of these jet fuels are well known. See military specification MIL-J-5624D and ASTM D1655-59T. JP-4 is essentially a wide boiling range gasoline composed of about 35 parts kerosene to about 65 parts aviation gasoline. JP-5 is a kerosene of high flash point (140° F.). JP-6 is a wide cut kerosene. Fuel compositions which may be stabilized according to my invention are jet fuels A, B, C, D, and E. Fuel A is a blend of several commercial unstable and stable JP-5 fuels. Fuel B is a commercial JP-5 fuel, fuel C is a JP-6 fuel, fuel D is a JP-4 fuel, and fuel E is a JP-5 fuel.

Table 1, which follows, gives the results of the stabilization of jet fuel with the amine-anhydride or aldehyde reaction products of this invention, including a comparison with the amine-EDTA reaction products of the type of the above-mentioned Ser. Nos. 65,954 and 77,843. The concentration of stabilizer used in this table was 5 pounds per thousand barrels (lb./1,000 bbl.) except for the control or blank, to which no stabilizer was added.

TABLE 1

| Stabilizer | Goodness Rating | Preheater Rating |
|---|---|---|
| None | 133 | 47 |
| Unmodified Primene 81-R-EDTA reaction product (Control) [1] | 640 | 40 |
| Reaction product of Example I | 825 | 31 |
| Reaction product of Example II | 710 | 37 |
| Reaction product of Example III | 760 | 35 |
| Primene 81-R | 430 | 42 |
| Primene 81-R-Salicylaldehyde Reaction Product | 160 | 47 |
| Reaction Product of Example IV | 715 | 38 |
| Reaction Product of Example V | 705 | 40 |
| Reaction Product of Example VI | 725 | 36 |
| Reaction Product of Example VII | 700 | 38 |
| Primene 81-R—Acetic Anhydride Reaction Product | 140 | 47 |

[1] Prepared as in Example I but excess amine not removed.

From the foregoing description and examples it should be apparent that I have provided a novel jet-fuel stabilizer which is highly effective against deterioration during present known use under high-temperature conditions as well as a novel method for the production of such stabilizer.

Although the invention has been described in considerable detail with particular reference to certain preferred embodiments thereof, variations and modifications can be effected within the spirit and scope of the invention as described hereinabove and as defined in the appended claim.

I claim:

A compound having the formula

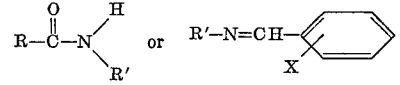

wherein R is methyl, ethyl or propyl, R' has the structure —(CH$_2$)$_n$—NH—R" and X is hydroxyl, halogen, lower alkyl or hydrogen, and in the structure

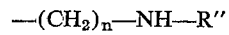

R" is an aliphatic hydrocarbon of 8 to 18 carbon atoms and $n$ is 2 or 3.

References Cited

UNITED STATES PATENTS

| | | | |
|---|---|---|---|
| 2,156,642 | 5/1939 | Slagh | 260—561 |
| 2,338,117 | 1/1944 | Graenacher et al. | 260—561 |
| 2,363,777 | 11/1944 | Downing et al. | 44—71 |
| 2,396,097 | 3/1946 | Gubelmann | 260—566 |
| 2,447,587 | 8/1948 | Martin et al. | 260—561 |
| 2,582,128 | 1/1952 | Hurwitz | 260—566 |
| 2,736,641 | 2/1956 | Mattson | 44—71 |
| 2,765,340 | 10/1956 | Haury | 260—566 |
| 2,914,560 | 11/1959 | Robertson | 260—566 |
| 2,914,570 | 11/1959 | Robertson | 260—566 |

OTHER REFERENCES

De Benneville et al.: Journal Org. Chem. vol. 21, pp. 1072–75 (1956).

Gertler et al.: U.S. Department of Agriculture ARS–33–14 pp. 1–5 relied on (1956).

WALTER A. MODANCE, *Primary Examiner.*

DANIEL E. WYMAN, NORMA S. MILESTONE,
*Examiners.*

Y. M. HARRIS, NATALIE TROUSOF,
*Assistant Examiners.*